United States Patent
Dinkel et al.

(10) Patent No.: US 6,773,078 B2
(45) Date of Patent: Aug. 10, 2004

(54) BRAKE PRESSURE CONTROL DEVICE

(75) Inventors: Dieter Dinkel, Schwalbach (DE); Axel Hinz, Neu-Anspach (DE); Hans-Dieter Reinartz, Frankfurt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 10/360,039

(22) Filed: Feb. 6, 2003

(65) Prior Publication Data

US 2003/0107263 A1 Jun. 12, 2003

Related U.S. Application Data

(62) Division of application No. 09/743,048, filed as application No. PCT/EP99/04599 on Jul. 2, 1999, now Pat. No. 6,554,375.

(30) Foreign Application Priority Data

| Jul. 8, 1998 | (DE) | 198 30 464 |
| Jul. 9, 1998 | (DE) | 198 30 749 |
| Oct. 26, 1998 | (DE) | 198 49 287 |

(51) Int. Cl.$^7$ .............. B60T 8/48; B60T 8/36; B60T 8/32; B60T 17/02; G05D 16/00
(52) U.S. Cl. ............. 303/113.1; 303/DIG. 3; 303/166; 303/119.3
(58) Field of Search .............. 303/DIG. 3, 166, 303/DIG. 4, 113.1, 119.1, 119.2, 119.3, 115.1–115.5, 113.2, 117.1; 251/129.01–129.22; 137/884, 560, 596.17, 625.26; 73/756; 701/70, 71, 80

(56) References Cited

U.S. PATENT DOCUMENTS

| 4,937,553 A | 6/1990 | Juckenack |
| 5,820,228 A | 10/1998 | Schneider et al. |
| 6,007,162 A | 12/1999 | Hinz et al. |
| 6,126,244 A | 10/2000 | Fries |
| 6,374,679 B1 | 4/2002 | Babala et al. |
| 6,554,375 B1 * | 4/2003 | Dinkel et al. |

FOREIGN PATENT DOCUMENTS

| DE | 25 56 023 | 6/1977 |
| DE | 3431823 | 3/1986 |
| DE | 3446683 | 7/1986 |
| DE | 40 13 160 | 10/1991 |
| DE | 42 32 311 | 2/1994 |
| DE | 43 20 391 | 12/1994 |
| DE | 44 31 250 | 3/1996 |
| DE | 195 14 383 | 10/1996 |
| EP | 0 157 944 | 10/1985 |
| EP | 0 411 826 | 2/1991 |
| EP | 0 816 142 | 1/1998 |
| EP | 0 845 397 | 6/1998 |
| JP | 485157 | 3/1992 |
| JP | 7165042 | 6/1995 |

OTHER PUBLICATIONS

Search Report of the German Patent Office for Application No. 198 49 287.1.

* cited by examiner

Primary Examiner—Douglas C. Butler
(74) Attorney, Agent, or Firm—Rader, Fishman & Grauer PLLC

(57) ABSTRACT

The present invention relates to a brake pressure control device, more particularly, for anti-lock pressure control and for automatic brake intervention for the purpose of traction slip control and/or driving dynamics control in automotive vehicle brake systems, including accommodating bores for pressure modulation valves arranged in a housing, pressure sensor connecting ports which lead into the housing and into which there are inserted pressure sensors that sense the pressure in a housing-side pressure fluid conduit respectively connected to a brake pressure generator. The pressure sensor connecting port either opens into the pressure fluid conduit between two accommodating bores that are directed into the housing, or is part of the pressure modulation valve.

13 Claims, 4 Drawing Sheets

BRAKE PRESSURE CONTROL DEVICE

RELATED APPLICATIONS

This application is a divisional of U.S. application Ser. No. 09/743,048 filed Mar. 8, 2001, now U.S. Pat. No. 6,554,375 issued Apr. 29, 2003 which is a 371 of PCT/EP99/04599 Filed Jul. 2, 1999.

TECHNICAL FIELD

The present invention generally relates to vechicle brakes and more particularly relates to a brake pressure control device for anti-lock pressure control and for automatic brake intervention.

BACKGROUND OF THE INVENTION

DE 42 32 311 C1 discloses a hydraulic automotive vehicle brake system with an anti-lock device which, for improvement of the vehicle tracking stability, is equipped with an automatic brake intervention device for driving dynamics control. Special measures are required to be taken both for driving dynamics control and for traction slip control in order to provide the pressure fluid necessary for brake intervention by means of a pump at a sufficient rapidity. One of these measures is, among others, the arrangement of a pressure sensor at the pressure fluid path extending from the brake pressure generator in order to sense the pilot pressure that is respectively generated by the driver in the brake pressure generator.

One constructive design variation for arranging a pressure sensor at a special precharging device for an automotive vehicle brake system is shown on page 687 of the ATZ Journal, 96$^{th}$ volume/no. 11. The arrangement of the pressure sensor at the housing of the so-called charging piston unit normally necessitates a complicated cable connection with the control and regulating electronics.

Further, DE 195 14 383 A1 describes a brake pressure control device which includes in a housing a plurality of accommodating bores for pressure modulation valves arranged in valve rows. Besides, pressure sensors are accommodated in the housing outside the valve rows, so that the basic contour of the housing and the arrangement of ducts in the block-shaped housing must be adapted to the pressure sensor arrangement chosen. In addition, the cover which closes the housing and the electronics disposed therein must be adapted due to the related increase of the housing dimensions. The drilling operation for the duct system necessitates intricate effort.

In view of the above, an object of the present invention is to configure a brake pressure control device of the type initially referred to in such a manner that a pressure sensor arrangement is provided with relatively little effort in terms of construction and manufacture which ensures the simplest possible connection of the pressure sensor arrangement to the existing duct system in the housing, while the original dimensions of the housing are maintained.

DETAILED DESCRIPTION OF THE PREFERRED EMBODIMENTS

Figure 1:
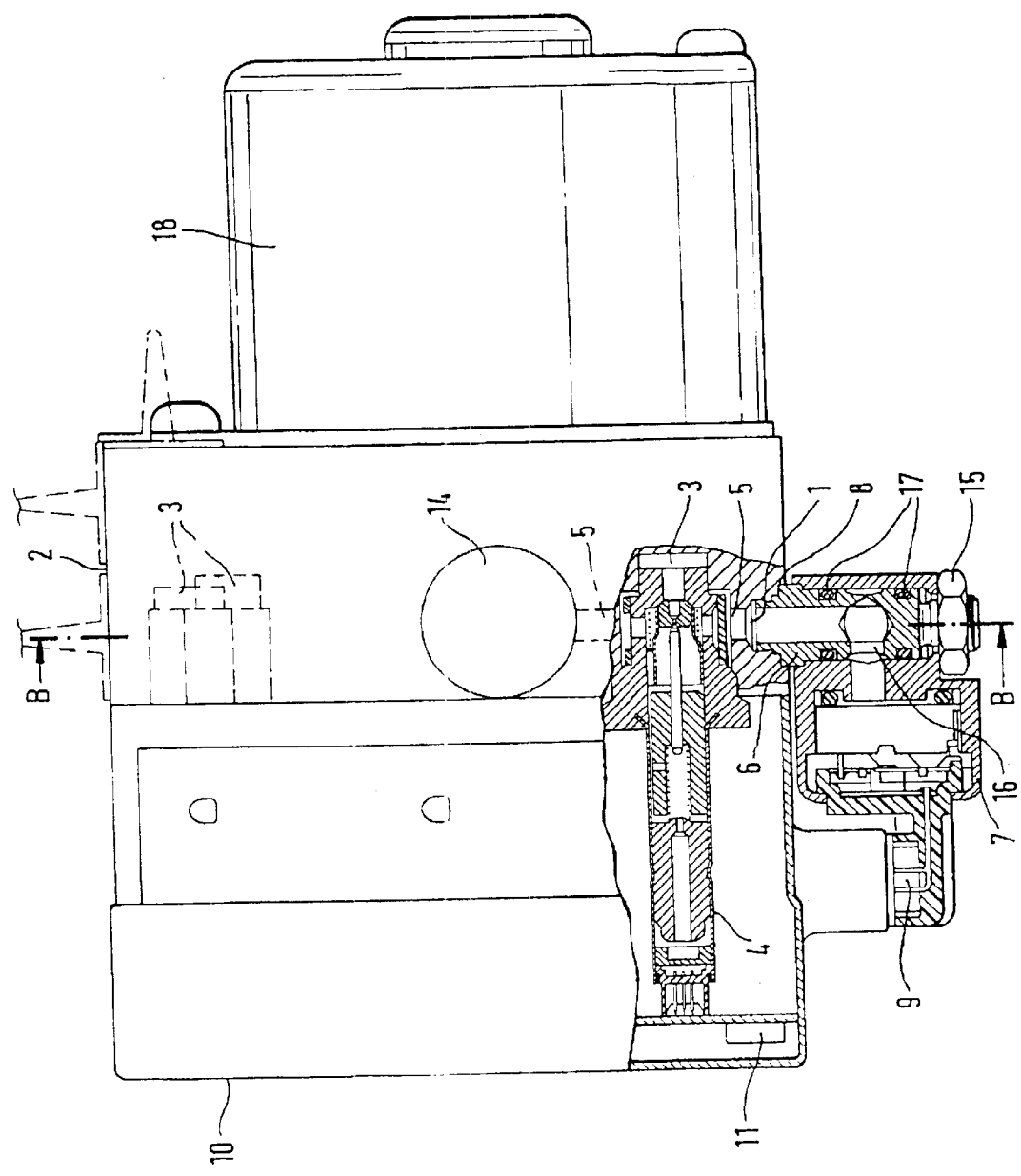
FIG. 1 is a partial cross-sectional view of a brake pressure control device in the area of a first suggested point of connection for a pressure sensor at a lateral housing surface.

FIG. 1 shows a considerably enlarged view of a brake pressure control device for a hydraulic automotive vehicle brake system that is connected to a brake pressure generator which, by way of pressure modulation valves 4 inserted into the brake pressure control device, is hydraulically connected to several wheel brakes and a pressure fluid accumulator system. The latter system is connected to a suction side of a motor-driven pump 14 having a pressure side which is connected to the brake pressure generator. Both the pump 14 and the pressure fluid accumulator system are integrated in the brake pressure control device. The pump 14 integrated in the block-shaped housing 2 between the rows of the pressure modulation valves 4 is with its pressure side in connection to a pressure fluid conduit 5 which extends from the brake pressure generator to the wheel brakes. Conduit 5 leads to the pressure modulation valves 4 in the housing 2 and to a pressure sensor 7 which is interconnected in terms of circuitry between the brake pressure generator and the pressure modulation valves 4 at the pressure fluid conduit 5. The pressure sensor 7 is fitted at a pressure sensor connecting port 1 directed into the housing 2, which port extends from the end surface of the housing 2 and opens into the pressure fluid conduit 5. The pressure sensor connecting port 1 is disposed between the accommodating bores 3 which are directed into the housing 2 and provided for the pressure modulation valves 4. One of the pressure modulation valves 4 is also shown in a cross-section in the foreground of the housing area with the pressure sensor 7. It is proposed in FIG. 1 of the present embodiment to introduce the pressure sensor connecting port 1 transversely into the housing 2 and, thus, preferably at right angles to the accommodating bore 3 for the pressure modulation valve 4, as shown in the cross-sectional view. The pressure sensor connecting port 1 opens directly into the pressure fluid conduit 5 on the housing side which enters the housing 2 between the illustrated accommodating bore 3 and another accommodating bore 3 positioned behind in a valve row. Attached in the pressure sensor connecting port 1 is a substantially sleeve-shaped adapter 6 by means of self-shearing engagement, the said adapter carrying the pressure sensor 7 at its extension projecting from the pressure sensor connecting port 1. The pressure sensor 7 is operatively secured by means of a screw coupling on the sleeve-shaped portion of the adapter 6 that projects from the pressure sensor connecting port 1. To align the pressure sensor 7 and the adapter 6 on the housing 2, an adjustment means 8 in the shape of a hexagonal outer contour on the adapter and a hexagonal recess on the housing is fitted in the present embodiment, positioning the pressure sensor 7 with its electrical connection 9 in a desired position of direction of rotation with respect to the cover 10 seated on the housing 2. To this end, the pressure sensor 7 includes an annular housing portion which embraces the adapter 6 and adjacent to which is the cylindrical sensor housing which accommodates the sensor element and the electric and/or electronic components of the pressure sensor 7. Thus, pressure sensor 7 forms an independently operable subassembly for the straightforward attachment on the housing 2 and for the reliable electrical contacting of the electronic controller fitted in the cover 7, of which one electronic component is symbolically shown. In the present embodiment according to FIG. 1, the additional function of the hexagonal outer contour provided on the adapter 6 is to take up the torque produced when screwing the nut 16 onto the threaded portion on the adapter 6 that projects from the sensor housing, and the hexagonal outer contour can be calked additionally after press-fitting the adapter 6 into the pressure sensor connecting port 1 in order to relieve the press fit from load in the self-calking area due to the high hydraulic pressures. The sensor housing is conformed to the adapter 6 in the area of the hexagonal outer contour, to which end a hexagonal recess is provided on the annular housing portion of the pressure sensor 7, thereby ensuring a simple alignment for the electrical connection to the electronic controller already when the pressure sensor 7 is slipped onto the adapter 6. Another advantage of the arrangement of the pressure sensor 7 according to the drawing involves that after the drilling operation of the housing 2, a plug or a closure ball is not necessary due to the arrangement of the pressure sensor connecting port 1 at this location. Due to the fact that the pressure sensor 7 is fitted to the lateral surface of the housing 2 according to the principle of a sparkplug, the total brake pressure control device will not be considerably enlarged in size. The consequence is that the electrical connection 9 of the pressure sensor 7 in the capacity of a sparkplug, by means of a simple rigid electrical plug connection, engages directly into the matching plug on the lateral surface of the cover 10 which is connected to the electric or electronic components 11 inside the cover 10.

The adjustment means 8 described hereinabove may be omitted under certain circumstances in the event that the electrical connection 9 to the controller is effected by way of flexible cable strands. O-rings 17 are arranged on either side of the pressure measuring points 16 on the sleeve portion in order to seal the pressure sensor 7 on the adapter 6.

The arrangement and constructive design of one of the pressure modulation valves 4 may further be taken from FIG. 1 and will be illustrated in greater detail by way of FIG. 5 hereinbelow.

First, the especially compact overall design of the brake pressure control device shall be dealt with which includes the small block-shaped housing 2, on the right-hand end face of which, according to the drawing, an electric motor 18 for driving the pump 14 is flanged. The electrical connection of motor 18 extends through a bore 23 in the housing 2 to the opposite housing front face and, thus, to the electronic controller in the cover 10. Favorably, there are no peripherally laid cables but exclusively one integrated electric plug.

Figure 2:
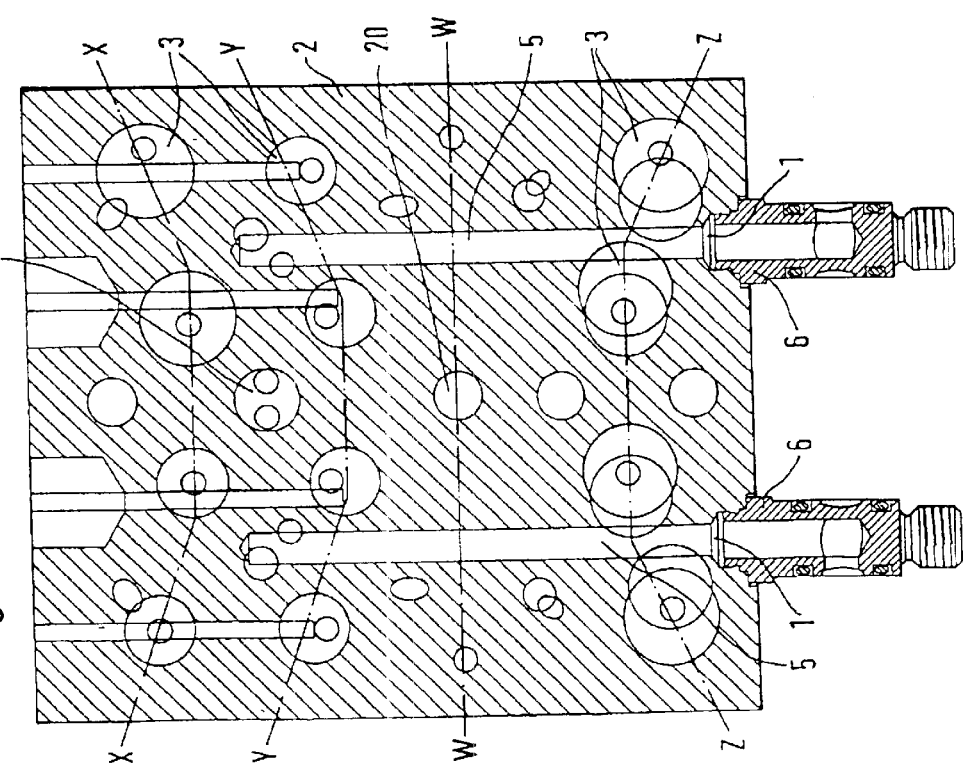
FIG. 2 is a top view of the brake pressure control device according to FIG. 1 on the cross-sectional plane BB of the housing block indicated in FIG. 1.

In the illustration of FIG. 2, the outline of the block-shaped housing 2 at the cross-section BB known from FIG. 1 is shown in a top view, swung at right angles out of the drawing plane. The cross-sectional surface of the housing 2 according to the drawing comprises a total of eight accommodating bores 3 in a first and second valve row X, Y. Electromagnetically operable inlet valves are inserted in the first valve row X and outlet valves in the second valve row Y. Beside and, thus, outside of the two valve rows X, Y in a cross-sectional plane that is positioned somewhat deeper, there is a horizontal pump accommodating bore which is covered by two parallel accumulator accommodating bores 19, as can be taken from FIG. 3. According to FIG. 3, the accumulator accommodating bores 19 are paraxial relative to the valve-accommodating bores and laterally of the two valve rows X, Y, while the pump accommodating bore which can be seen in FIG. 3 only at the lateral surfaces of the housing 2 extends along the axis W in parallel to the valve rows X, Y. Centrally between the two accumulator accommodating bores 19 there is a motor accommodating bore 20 which extends paraxially to the accumulator accommodating bores 19 as an enlarged stepped bore on the opposite housing end face in the drawing. The motor accommodating bore directed vertically to the pump bore not only accommodates the electric motor 18 shown in FIG. 1 but also the eccentric or crank drive necessary for the pump.

The second valve row Y which is positioned directly beside the pump axis W and the accumulator accommodating bores 19 accommodates the outlet valves which are necessary for brake pressure reduction in the wheel brakes. The inlet valves are placed in the accommodating bores 3 of the first valve row X which are spaced by the second valve row Y from the pump accommodating bore and the accumulator accommodating bores 19. The arrangement of the inlet valves in the first valve row X includes the advantage that the ports of the brake pressure generator which open into the block-shaped housing 2 close to the first valve row X and the ports that lead to the wheel brakes are equally positioned as close as possible to one another, with the result of a uniform connecting pattern for the brake lines on one lateral surface of the block-shaped housing 2.

Figure 3:
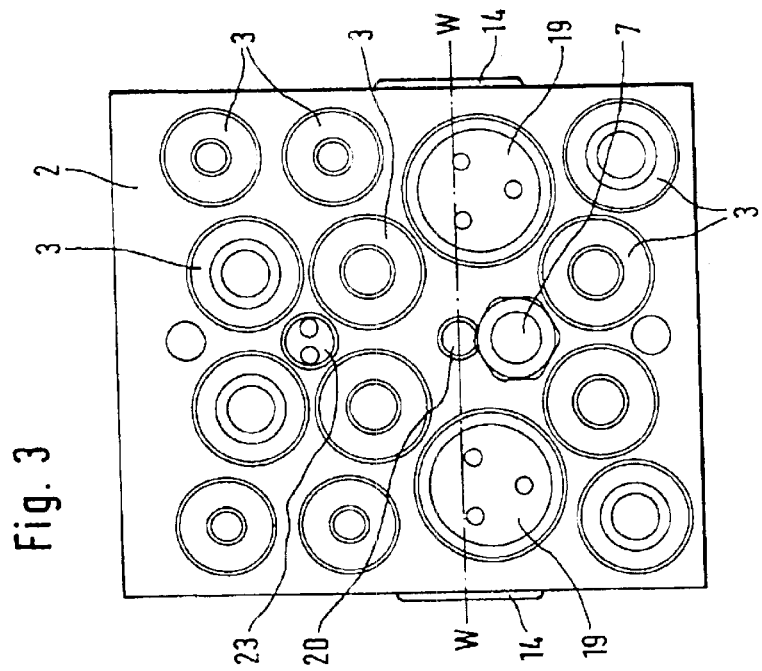
FIG. 3 is a top view of the end surface of the housing of the brake pressure control device with an arrangement of the pressure sensor between the valve rows.

In addition, a third valve row Z can be taken from FIGS. 2 and 3 which opens into the housing surface remote from the first and second valve row X, Y. The third valve row Z which is thus positioned directly adjacent the two accumulator accommodating bores ensures a simple functional extension of the brake pressure control device designed for anti-lock pressure control for the purpose of a traction slip and driving dynamics control, to what end magnetic valves configured as electric change-over valves and closed in their initial position are inserted into the two external accommodating bores 3 of the third valve row Z (see FIGS. 1, 5). Magnetic valves that are open in their initial position are inserted into the two intermediate accommodating bores of the valve row Z.

FIG. 2 differs from FIG. 3 by the different arrangement of the pressure sensor ports. In a first embodiment according to FIG. 2, the pressure fluid conduits 5 of both brake circuits which extend in parallel between the individual accommodating bores 3 are closed by means of the pressure sensors 7 arranged on the adapters 6 in the lateral exit area of the block-shaped housing 2, so that simple connecting possibilities for pressure sensing are provided, while the existing duct system in the housing 2 is exactly maintained. The result is that previous blind holes, after completion of the drilling operation, are replaced in a surprisingly simple fashion by pressure sensor ports which cause only a small length projecting from housing 2, while the original design of the brake pressure control device is maintained.

On the other hand, another suitable variation of solution suggested in FIG. 3 includes aligning at least one pressure sensor connecting port 1 paraxially to the accommodating bores 3 of the pressure modulation valves 4 in the housing 2, and the free space that remained between the accumulator accommodating bores 19 is especially suitable therefor, so that the pressure sensor opening 1 can be produced in one process simultaneously with the drilling operation for the pressure modulation valves 4 and accumulator accommodating bores 19.

Figure 4:
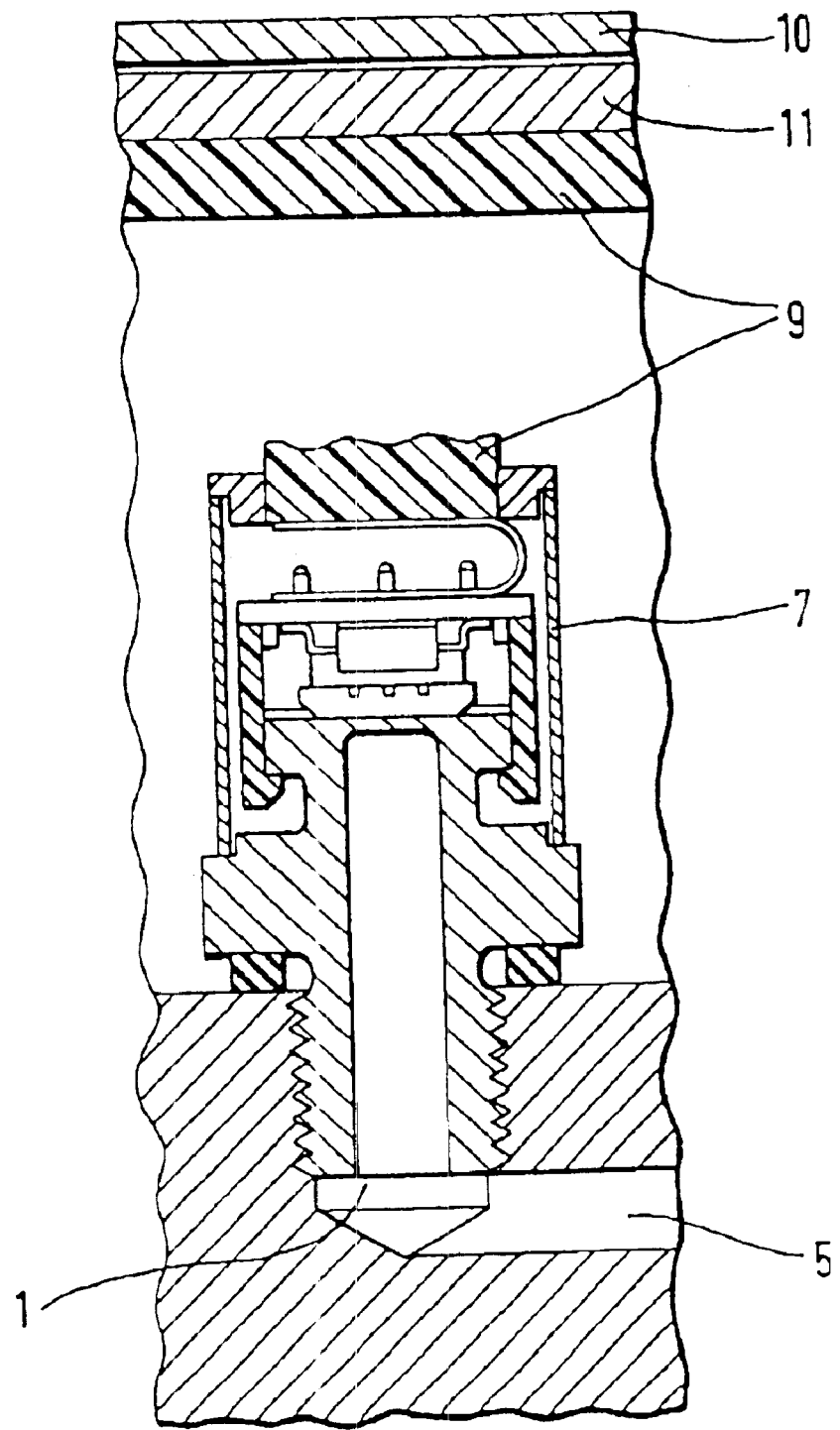
FIG. 4 is a lateral cross-sectional view of the housing shown in FIG. 3 in the area of the pressure sensor and a cross-sectional view of the pressure sensor of this invention.

FIG. 4 shows a cross-sectional view of the area of the housing 2 which is necessary to accommodate the pressure sensor 7. To connect the pressure sensor 7 to the pressure fluid conduit 5, only the above-mentioned drilling operation is required which meets the pressure fluid conduit 5 at right angles. The advantage involved is that the pressure sensor 7 is arranged on the housing 2 at a protected location and is closed by cover 10. A simple contacting is ensured by means of an electric plug coupling between the cover 10 in which the electric components 11 are incorporated and the pressure sensor 7. In the present embodiment according to FIG. 4, the pressure sensor 7 is configured as a screw-in cartridge, however, the press fit or calking connection described hereinabove can also be used.

Figure 5:
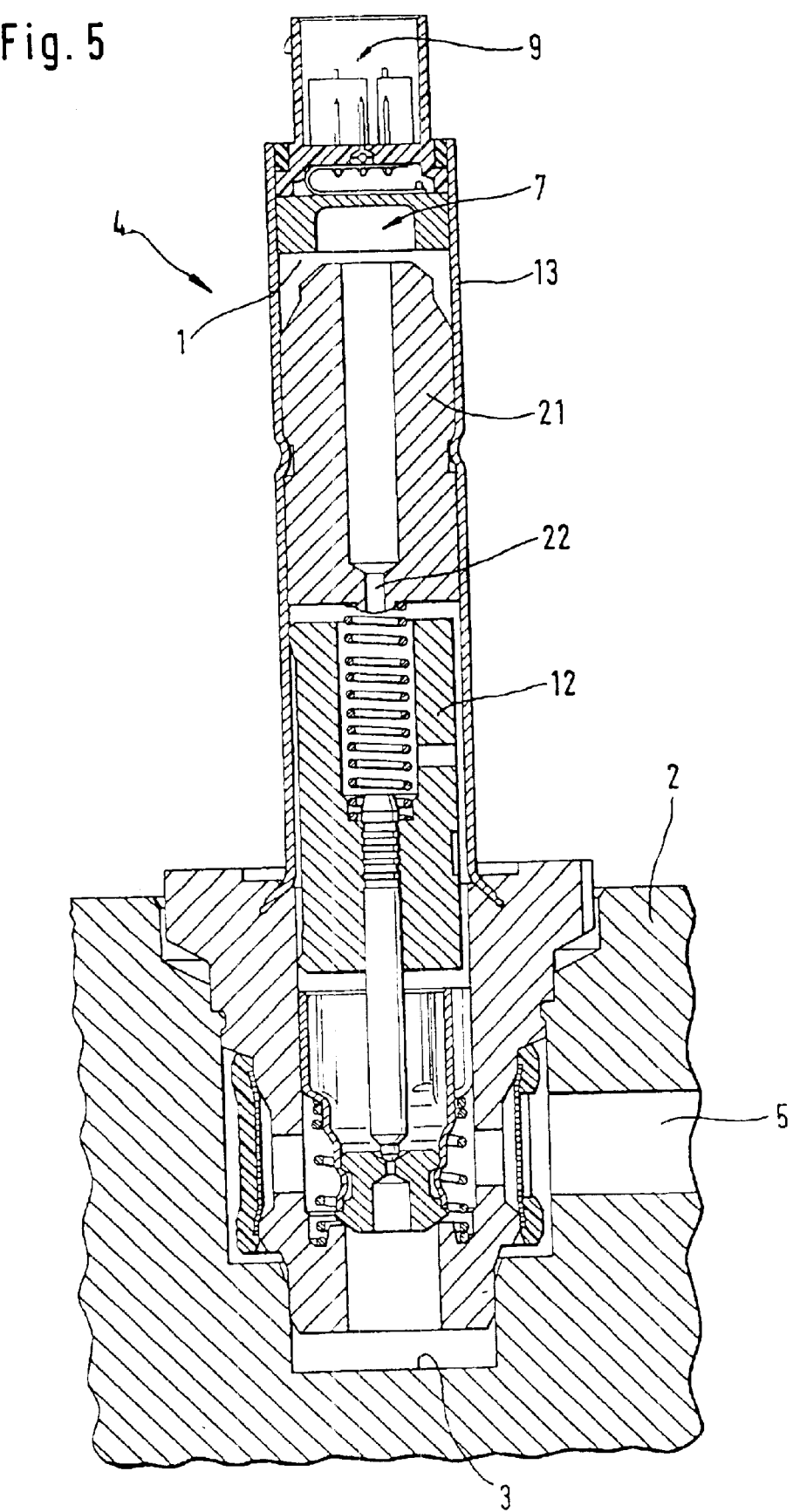
FIG. 5 is an alternative arrangement of the pressure sensor within a pressure modulation valve which is inserted into the housing of the braking pressure control device.

One possible alternative with respect to the preceding embodiments shall now be explained more closely by way of FIG. 5. FIG. 5 shows a considerably enlarged cross-sectional view of the block-shaped housing 2 in the area of the accommodating bore 3 which carries the above-mentioned electric change-over valve in the valve row Z. According to the present invention, the pressure sensor connecting port 1 is integrated in the sleeve portion 13 of the mentioned pressure modulation valve 4 which has a permanent hydraulic connection with the pressure fluid conduit 5 that is in connection with the brake pressure generator. The pressure sensor 7 is inserted into the end of the sleeve portion 13 in a pressure-fluid tight manner so that a pressure fluid chamber is produced above the magnetic core 21 and is connected to the pressure fluid conduit 5 by way of a through-bore 22 in the magnetic core 21 along the slot between the magnetic armature 12 and the valve sleeve. Consequently, only the electric connection 9 of the pressure sensor 7 projects from the sleeve portion 13 and is assembled directly with the electronics 11 integrated in the cover 10, thereby providing a particularly space-saving arrangement of the pressure sensor 7. The result is that the sleeve portion 13 not only assumes the function of sealing the valve cartridge outwardly, fixing the magnetic core 21 in position and guiding the valve tappet with the magnetic armature 12, but additionally serves as a pressure sensor accommodating means which, in addition to its proper task, fulfils the function of a sealing element that closes the pressure modulation valve 4.

What is claimed is:

1. Brake pressure control device, for anti-lock pressure control and for automatic brake intervention for the purpose of traction slip control or driving dynamics control in automotive vehicle brake systems, comprising:
    a housing having accommodating bores for pressure modulation valves arranged therein,
    pressure sensor connecting ports which lead into the housing,
    pressure sensors residing in the pressure sensor connecting ports for sensing the pressure in a housing-side pressure fluid conduit respectively connected to a brake pressure generator, wherein the pressure sensor connecting ports open into the pressure fluid conduit between two accommodating bores that are directed into the housing, wherein the respective pressure sensor connecting ports extend transversely into the housing, at right angles to the accommodating bores for the pressure modulation valves.

2. Brake pressure control device as claimed in claim 1, wherein the respective pressure sensor connecting ports extend into the housing paraxially to the accommodating bores for the pressure modulation valves.

3. Brake pressure control device as claimed in claim 1, wherein the respective pressure sensor connecting ports open directly into the housing-side pressure fluid conduit which connects the brake pressure generator connected to the housing to the accommodating bore of a respective pressure modulation valve.

4. Brake pressure control device as claimed in claim 1, further including a generally sleeve-shaped adapter residing within the pressure sensor connecting ports in operative or form-locking engagement therewith, said adapter carrying the respective pressure sensor at its extension projecting from the respective pressure sensor connecting ports.

5. Brake pressure control device as claimed in claim 4, wherein said adapter further includes an adjustment means for positioning the respective pressure sensor with its electrical connection in a desired direction of rotation position relative to the housing.

6. Brake pressure control device as claimed in claim 4, wherein the respective pressure sensor includes an annular housing portion which is seated and screwed on the adapter.

7. Brake pressure control device as claimed in claim 1, further including a cover secured to the housing and arranged on the pressure modulation valves, wherein the cover houses electric or electronic components which have an electrical connection to the respective pressure sensor.

8. Brake pressure control device, for anti-lock pressure control and for automatic brake intervention for the purpose of traction slip control or driving dynamics control in automotive vehicle brake systems, comprising:
    a housing having accommodating bores for pressure modulation valves arranged therein,
    pressure sensor connecting ports which lead into the housing,
    pressure sensors residing in the pressure sensor connecting ports for sensing the pressure in a housing-side pressure fluid conduit respectively connected to a brake pressure generator, wherein the pressure sensor connecting ports open into the pressure fluid conduit between two accommodating bores that are directed into the housing,
    further including a generally sleeve-shaped adapter residing within the pressure sensor connecting ports in operative or form-locking engagement therewith, the said adapter carrying the pressure sensor at its extension projecting from the respective pressure sensor connecting port.

9. Brake pressure control device as claimed in claim 8, wherein the pressure sensor connecting ports extend into the housing paraxially to the accommodating bores for the pressure modulation valves.

10. Brake pressure control device as claimed in claim 8, wherein the respective pressure sensor is attached in an operative or form-locking fashion to the sleeve-shaped portion of the adapter which projects from the pressure sensor connecting ports.

11. Brake pressure control device as claimed in claim 8, wherein said adapter further includes an adjustment means for positioning the respective pressure sensor with its electrical connection in a desired direction of rotation position relative to the housing.

12. Brake pressure control device as claimed in claim 8, wherein the respective pressure sensor includes an annular housing portion which is seated and screwed on the adapter.

13. Brake pressure control device as claimed in claim 8, further including a cover secured to the housing and arranged on the pressure modulation valves, wherein the cover houses electric or electronic components which have an electrical connection to the respective pressure sensor.

* * * * *